United States Patent
Nakajima et al.

(10) Patent No.: US 11,956,386 B2
(45) Date of Patent: Apr. 9, 2024

(54) COMMUNICATION CONTROL DEVICE, EMERGENCY CALL ORIGINATING METHOD, AND EMERGENCY CALL ORIGINATING PROGRAM

(71) Applicant: Nippon Telegraph and Telephone Corporation, Tokyo (JP)

(72) Inventors: Daiki Nakajima, Tokyo (JP); Taichi Osada, Tokyo (JP); Mikio Isawa, Tokyo (JP); Yasuhiro Seki, Tokyo (JP); Hiroaki Matsumura, Tokyo (JP); Shinya Narita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 481 days.

(21) Appl. No.: 17/293,151

(22) PCT Filed: Nov. 1, 2019

(86) PCT No.: PCT/JP2019/043099
§ 371 (c)(1),
(2) Date: May 12, 2021

(87) PCT Pub. No.: WO2020/100635
PCT Pub. Date: May 22, 2020

(65) Prior Publication Data
US 2022/0006901 A1    Jan. 6, 2022

(30) Foreign Application Priority Data

Nov. 16, 2018  (JP) ................................. 2018-215208

(51) Int. Cl.
*H04M 3/51* (2006.01)
*H04W 4/90* (2018.01)

(52) U.S. Cl.
CPC .......... *H04M 3/5116* (2013.01); *H04W 4/90* (2018.02); *H04M 2242/04* (2013.01)

(58) Field of Classification Search
CPC .......... H04M 3/5116; H04M 2242/04; H04M 2201/14; H04M 2201/16; H04M 2201/22;
(Continued)

(56) References Cited

U.S. PATENT DOCUMENTS 4,176,254 A * 11/1979 Tuttle ..................... H04M 11/04
                                                                   379/49
10,021,229 B1 * 7/2018 Engelke .................. H04W 4/16
(Continued)

FOREIGN PATENT DOCUMENTS

| JP | 2001-320749 | 11/2001 |
| JP | 2004-120715 | 4/2004 |
| JP | 4672571 | 4/2011 |

OTHER PUBLICATIONS

[No Author Listed], "Information and Communication Council Telecommunications Business Policy Subcommittee," Ministry of Internal Affairs and Communications, Jun. 2, 2017, 75 pages (with English Translation).

*Primary Examiner* — Lisa Hashem
(74) *Attorney, Agent, or Firm* — Fish & Richardson P.C.

(57) ABSTRACT

An emergency report can be made to a plurality of emergency services. Provided is a communication control device 2 housing a subscriber terminal 1, and the communication control device 2 includes: a call control unit 21 that connects an emergency call made from the subscriber terminal 1 to an emergency-call reception switchboard 5; and an outgoing/incoming call inhibition unit 22 that inhibits outgoing/incoming calls from/to the subscriber terminal 1 in a prescribed period, when the emergency call is disconnected by the subscriber terminal 1. The outgoing/incoming call inhibition unit 22: when a call is made from the subscriber
(Continued)

terminal 1 in the prescribed period, determines whether the call is an emergency call or a general call; in a case of an emergency call, cancels inhibition for outgoing/incoming calls from/to the subscriber terminal 1 and connects the call by using the call control unit 21; and in a case of a general call, does not connect the call.

9 Claims, 5 Drawing Sheets

(58) Field of Classification Search
    CPC ...... H04M 3/38; H04M 3/5231; H04M 11/04; H04W 4/90
    See application file for complete search history.

(56) References Cited

U.S. PATENT DOCUMENTS

| | | | |
|---|---|---|---|
| 10,743,168 B1* | 8/2020 | Erenel | H04W 68/005 |
| 11,825,008 B2* | 11/2023 | Engelke | H04M 1/2475 |
| 2002/0101860 A1* | 8/2002 | Thornton | H04L 65/1101 |
| | | | 370/401 |
| 2002/0111159 A1* | 8/2002 | Faccin | H04M 3/5116 |
| | | | 455/445 |
| 2014/0051379 A1* | 2/2014 | Ganesh | H04W 4/90 |
| | | | 455/404.1 |
| 2023/0208962 A1* | 6/2023 | Engelke | H04W 4/90 |
| | | | 455/404.1 |
| 2023/0388416 A1* | 11/2023 | Srivastava | G06Q 10/10 |

\* cited by examiner

| SUBSCRIBER TERMINAL | INHIBITION CANCEL PATTERN |
| --- | --- |
| SUBSCRIBER TERMINAL A | CANCEL INHIBITION FOR OUTGOING/INCOMING CALLS |
| SUBSCRIBER TERMINAL B | CANCEL INHIBITION FOR OUTGOING CALL OR INHIBITION FOR INCOMING CALL |
| ⋮ | |

COMMUNICATION CONTROL DEVICE, EMERGENCY CALL ORIGINATING METHOD, AND EMERGENCY CALL ORIGINATING PROGRAM

CROSS-REFERENCE TO RELATED APPLICATIONS

This application is a National Stage application under 35 U.S.C. § 371 of International Application No. PCT/JP2019/043099, having an International Filing Date of Nov. 1, 2019, which claims priority to Japanese Application Serial No. 2018-215208, filed on Nov. 16, 2018. The disclosure of the prior application is considered part of the disclosure of this application, and is incorporated in its entirety into this application.

TECHNICAL FIELD

The present invention relates to a technique that makes it possible to continuously make an emergency report.

BACKGROUND ART

There may be a case where a caller (the person making a call), when making an emergency report to an emergency telephone number such as 110 or 119, may hang up the call without delivering necessary information completely because the caller is in a panic or the like. Therefore, conventionally, a call-back from the emergency service to the caller is enabled by putting the line between the caller and the receiver of the emergency report on hold, inhibiting outgoing calls from the caller, and the like (see Patent Literature 1, Non-Patent Literature 1).

CITATION LIST

Patent Literature

Patent Literature 1: Japanese Patent No. 4672571

Non-Patent Literature

Non-Patent Literature 1: Information and Communications Council, "Telecommunications Business Policy Subcommittee, Telephone Network Transition Facilitation Committee (32nd) Minutes" http://www.soumu.go.jp/main_content/000514335.pdf

SUMMARY OF THE INVENTION

Technical Problem

In order to allow the emergency services to make a call-back to the caller, the caller cannot make a call continuously to a plurality of emergency services. For example, when encountered to a possible crime situation requiring a relief, the caller first dials 119 to call an ambulance. Then, the caller tries to dial 110 to make a report to the police. However, the caller cannot make a call to 110 in order to prepare for a call-back from 119.

As described, there are such cases where emergency reports cannot be made quickly to a plurality of emergency services, and it is an issue also in Telephone Network Transition Facilitation Committee of Non-Patent Literature 1 due to an offered opinion from the emergency services.

The present invention is designed in view of the foregoing circumstances, and an object of the present invention is to be able to make an emergency report to a plurality of emergency services.

Means for Solving the Problem

In order to achieve the foregoing object, the present invention is a communication control device housing a subscriber terminal, and the communication control device includes: a call control unit that connects an emergency call made from the subscriber terminal to an emergency-call reception switchboard; and an outgoing/incoming call inhibition unit that inhibits outgoing/incoming calls from/to the subscriber terminal in a prescribed period, when the emergency call is disconnected by the subscriber terminal, wherein the outgoing/incoming call inhibition unit: when a call is made from the subscriber terminal in the prescribed period, determines whether the call is an emergency call or a general call; in a case of an emergency call, cancels inhibition for outgoing/incoming calls from/to the subscriber terminal and connects the call by using the call control unit; and in a case of a general call, does not connect the call.

The present invention is an emergency call method performed by a communication control device housing a subscriber terminal, and the emergency call method includes: a call control step of connecting an emergency call made from the subscriber terminal to an emergency-call reception switchboard; and an outgoing/incoming call inhibition step of inhibiting outgoing/incoming calls from/to the subscriber terminal in a prescribed period, when the emergency call is disconnected by the subscriber terminal, wherein the outgoing/incoming call inhibition step: when a call is made from the subscriber terminal in the prescribed period, determines whether the call is an emergency call or a general call; in a case of an emergency call, cancels inhibition for outgoing/incoming calls from/to the subscriber terminal and connects the call; and in a case of a general call, does not connect the call.

The present invention is an emergency call program causing a computer to function as the communication control device.

Effects of the Invention

According to the present invention, it is possible to make an emergency report to a plurality of emergency services.

DESCRIPTION OF EMBODIMENT

Hereinafter, an embodiment of the present invention will be described with reference to the accompanying drawings.

Figure 1:
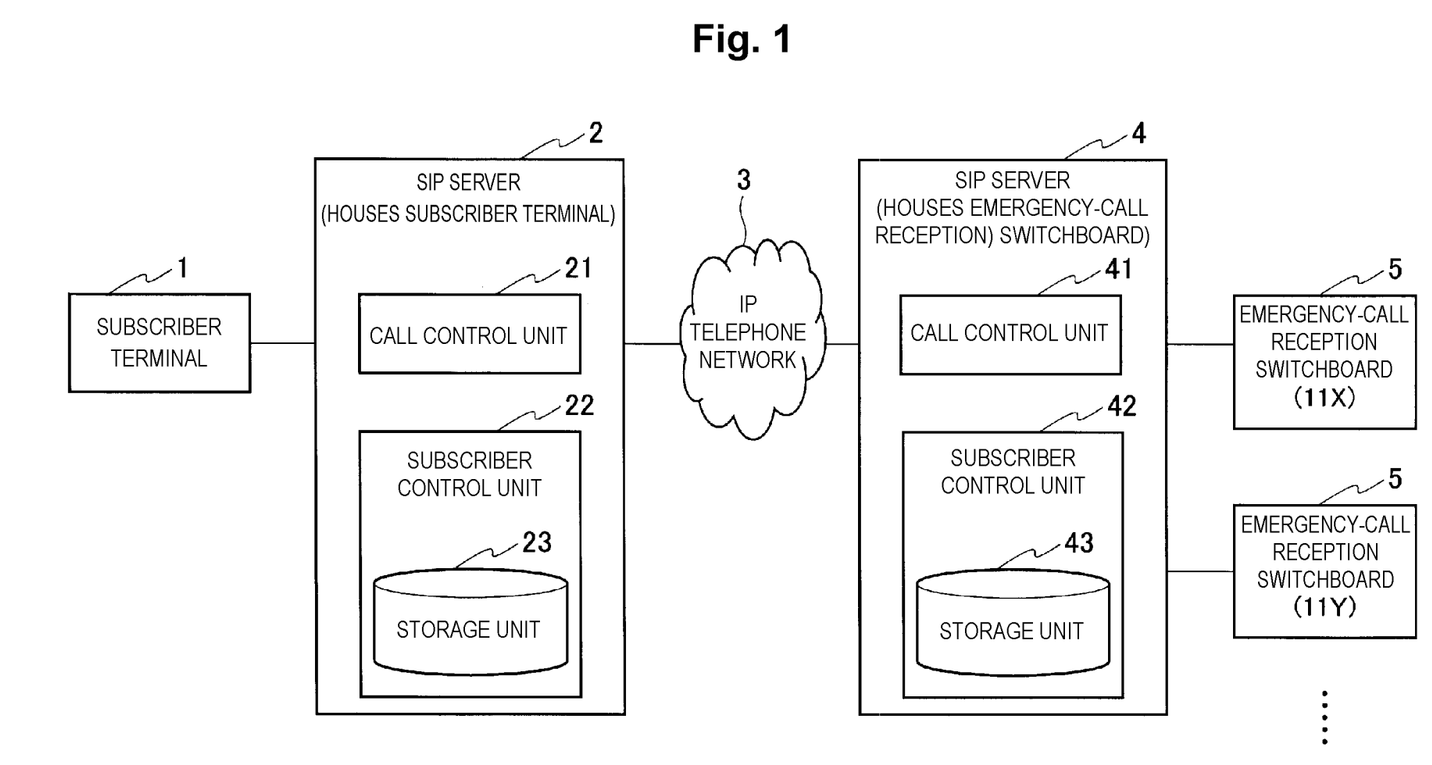
FIG. 1 is a diagram showing an entire configuration of a communication system according to an embodiment of the present invention.

FIG. 1 is a diagram showing an entire configuration of a communication system according to an embodiment of the present invention. The illustrated communication system includes: a subscriber terminal 1; an SIP server 2 that houses the subscriber terminal 1; a plurality of emergency-call reception switchboards 5; and an SIP server 4 that houses the emergency-call reception switchboards 5. The subscriber terminal 1 is a terminal having a telephone function and, for example, an SIP terminal or the like can be used therefor.

The SIP server 2 (communication control device) houses the subscriber terminal 1, and is connected to the SIP server 4 via an IP telephone network 3. The SIP server 2 is a server that performs call control (call processing) such as making outgoing calls and receiving incoming calls by using an SIP (Session Initiation Protocol). The illustrated SIP server 2 includes a call control unit 21 and a subscriber control unit 22 (outgoing/incoming call inhibition unit).

The call control unit 21 connects a call made from the subscriber terminal 1 to its destination. For example, the call control unit 21 connects an emergency call made from the subscriber terminal 1 to the emergency-call reception switchboard 5.

The subscriber control unit 22 performs control of the subscriber terminal 1 housed in the own device. The subscriber control unit 22 of the embodiment executes and processes an outgoing/incoming call inhibition function in cooperation with the call control unit 21. The illustrated subscriber control unit includes a storage unit 23.

When an emergency call is disconnected by the subscriber terminal 1, the subscriber control unit 22 inhibits outgoing/incoming calls from/to the subscriber terminal 1 in a prescribed period. Further, when a call is made from the subscriber terminal 1 in the prescribed period, the subscriber control unit 22 determines whether the call is an emergency call or a general call and, when determined as an emergency call, cancels inhibition for outgoing/incoming calls from/to the subscriber terminal 1, and connects the call by using the call control unit 21. When the call is a general call, the subscriber control unit 22 does not connect the call. Further, the subscriber control unit 22 stores data including a caller number and a destination number of the emergency call made from the subscriber terminal 1 in the storage unit 23, and holds the data in the storage unit 23 for a prescribed period from the point where the emergency call is disconnected by the subscriber terminal 1. Further, during the prescribed period, the subscriber control unit 22 permits only an incoming call to the subscriber terminal 1 made from the emergency-call reception switchboard 5.

In the storage unit 23, the data (record) including the caller number (number of the subscriber terminal 1) of the emergency call and the destination number (number of the emergency-call reception switchboard 5) is stored. Further, in the storage unit 23, the data is held for a prescribed period from the point where the emergency call is disconnected by the subscriber terminal 1. Further, the data may include a flag indicating whether or not it is in the outgoing/incoming call inhibition period. When the prescribed period has passed, the subscriber control unit 22 deletes the data of the caller number and the destination number of the corresponding emergency call from the storage unit 23.

The SIP server 4 is a server that houses the emergency-call reception switchboards 5, and performs call control such as making outgoing calls and receiving incoming calls by using an SIP. The SIP server 4 includes a call control unit 41 and a subscriber control unit 42. The call control unit 41 makes an outgoing call from the emergency-call reception switchboard 5 and receives an incoming call made to the emergency-call reception switchboard 5. Further, in a case of a call-back from the emergency-call reception switchboard 5, the call control unit 41 makes a call to the subscriber terminal 1 by adding a prescribed identifier indicating that it is a call-back. For example, the call control unit 41 sets a prescribed identifier within Alert-Info header of an INVITE request of the SIP. The subscriber control unit 42 performs control of the emergency-call reception switchboards 5 housed in the own device. While the subscriber control unit 42 herein includes a storage unit 43, there may be no storage unit 43.

Further, while a case of housing a plurality of emergency-call reception switchboards 5 is presented as an example, the illustrated SIP server 4 is not limited thereto. The SIP server 4 may house a single emergency-call reception switchboard 5, or there may be a plurality of SIP servers housing a single emergency-call reception switchboard 5.

The emergency-call reception switchboards 5 are telephone terminals of the emergency services that provide report services to the emergency telephone numbers such as 110, 118, and 119. The communication system of the embodiment includes the emergency-call reception switchboards 5 for a plurality of kinds of emergency services.

As the SIP servers 2 and 4 described above, it is possible to use a multi-purpose computer system that includes a CPU (Central Processing Unit, processor), a memory, a storage (HDD: Hard Disk Drive, SSD: Solid State Drive), a communication device, an input device, and an output device, for example. In the computer system, each function of the SIP servers 2 and 4 can be achieved through executing, by the CPU, programs for the SIP servers 2 and 4 loaded on the memory. Further, the programs for the SIP server 2 and 4 can be stored in a computer-readable recording medium such as an HDD, an SSD, a USB memory, a CD-ROM, a DVD-ROM, or an MO, or may be distributed via a network.

Next, operations of the communication system according to the embodiment will be described.

Figure 2:
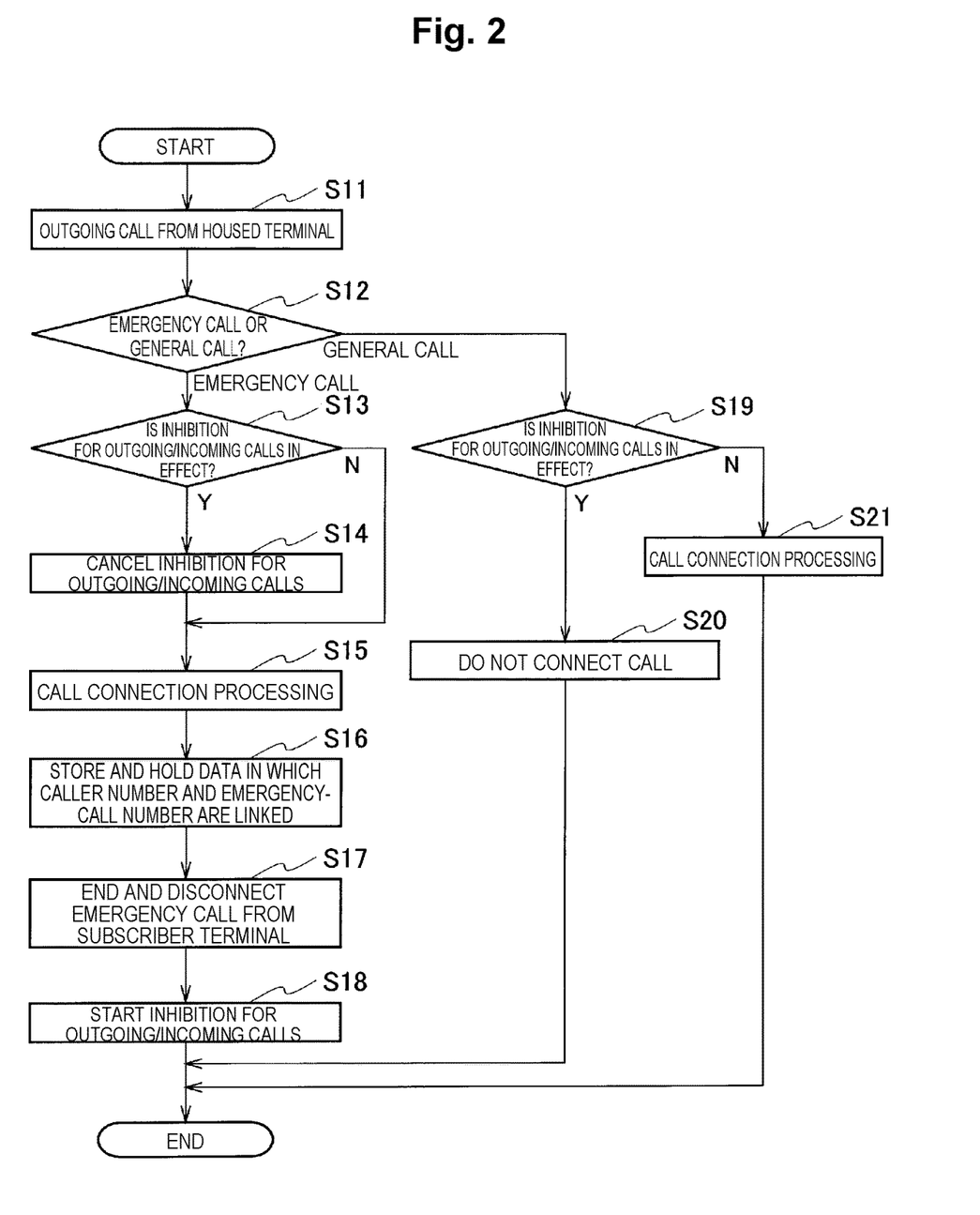
FIG. 2 is a flowchart of emergency call processing.

FIG. 2 is a flowchart of emergency call processing executed by the SIP server 2 that houses the subscriber terminal 1.

The subscriber control unit 22 of the SIP server 2 receives a call made from the subscriber terminal 1 (S11), and determines whether or not the destination of the received call is the number for an emergency call, that is, whether or not it is an emergency telephone number based on the dialed number (S12).

When the dialed number of the destination is a number other than that of an emergency call (S12: NO), the subscriber control unit 22 determines that the call is a general call and determines, by referring to the storage unit 23, whether or not the subscriber terminal 1 that made the call is in the outgoing/incoming call inhibition period (S19). When data including the number of the subscriber terminal 1 that made the call in S11 is stored in the storage unit 23 and a flag indicating that the outgoing/incoming call inhibition period is in effect is set therein, the subscriber control unit 22 determines that it is in the outgoing/incoming call inhibition period. Further, when the data including the number of the subscriber terminal 1 that made the call in S11 is not stored in the storage unit 23 or when the data including the number of the subscriber terminal 1 is stored in the storage unit 23 but a flag indicating that the outgoing/incoming call inhibition period is in effect is not set therein, the subscriber control unit 22 determines that it is not in the outgoing/incoming call inhibition period.

When the outgoing/incoming call inhibition period is in effect (S19: YES), the subscriber control unit 22 does not perform connection processing of the call (S20). When the outgoing/incoming call inhibition period is not in effect (S19: NO), the outgoing/incoming call inhibition unit 22 performs normal call connection processing by using the call control unit 21 (S21). That is, according to an instruction from the outgoing/incoming call inhibition unit 22, the call control unit 21 performs processing for connecting the call made from the subscriber terminal 1 in S11 to the subscriber terminal of the destination.

In the meantime, when the dialed number of the destination is a number for an emergency call (emergency telephone number) (S12: YES), the outgoing/incoming call inhibition unit 22 determines that the call is an emergency call and, as in S19, determines whether or not the subscriber terminal 1 that made the call is in the outgoing/incoming call inhibition period by referring to the storage unit 23 (S13). When the outgoing/incoming call inhibition period is in effect (S13: YES), the subscriber control unit 22 cancels inhibition for outgoing/incoming calls (S14), and executes call connection processing to the emergency-call reception switchboard 5 by using the call control unit 21 (S15). When the outgoing/incoming call inhibition period is not in effect (S13: NO), the subscriber control unit 22 performs call connection processing to the emergency-call reception switchboard 5 by using the call control unit 21 (S15). According to an instruction from the outgoing/incoming call inhibition unit 22, the call control unit 21 performs processing for connecting the call made from the subscriber terminal 1 in S11 to the emergency-call reception switchboard 5 as the destination. Thereby, the caller of the subscriber terminal 1 and the operator of the emergency-call reception switchboard 5 come in a communicable state.

Then, the subscriber control unit 22 stores, in the storage unit 23, the data in which the caller number of the emergency call (the number of the subscriber terminal 1) and the destination number (the number of the emergency-call reception switchboard 5) are linked (S16). Note that the subscriber control unit 22 at this point does not set, to the data, a flag indicating that the outgoing/incoming call inhibition period is in effect.

Then, upon receiving a call disconnection request from the subscriber terminal 1, the call control unit 21 disconnects the call (session) between the subscriber terminal 1 and the emergency-call reception switchboard 5 (S17). Upon receiving a notification of the call disconnection request from the call control unit 21, the subscriber control unit 22 starts to inhibit outgoing/incoming calls from/to the subscriber terminal 1 that made the call in S11 (S18). That is, when the emergency call is disconnected by the subscriber terminal 1, the subscriber control unit 22 inhibits outgoing/incoming calls from/to the subscriber terminal 1 in the outgoing/incoming call inhibition period that is the prescribed period. During the outgoing/incoming call inhibition period, the subscriber control unit 22 permits only an incoming call to the subscriber terminal 1 from the emergency-call reception switchboard 5 to which the call is made in S11 in order to securely make a call-back from the emergency-call reception switchboard 5.

Further, the subscriber control unit 22 sets a flag indicating that the outgoing/incoming call inhibition period is in effect to the data in which the caller number and the destination number of the emergency call are linked and stored in the storage unit 23 in S14. Thereby, the subscriber control unit 22 can determine the subscriber terminal 1 in the outgoing/incoming call inhibition period by referring to the storage unit 23. Note that the subscriber control unit 22 holds, in the storage unit 23, the data including the caller number and the destination number of the emergency call stored in the storage unit 23 for a prescribed period from the point where the emergency call is disconnected by the subscriber terminal 1 in S15.

When a call disconnection request from the emergency-call reception switchboard 5 is received in S17, the call control unit 21 disconnects the call (session) between the subscriber terminal 1 and the emergency-call reception switchboard 5. In that case, the subscriber control unit 22 does not inhibit outgoing/incoming calls in S18 and deletes, from the storage unit 23, the data stored in S16 in which the number of the subscriber terminal 1 that made the emergency call and the number of the emergency-call reception switchboard 5 are linked.

With the emergency call processing of the embodiment described above, the caller of the subscriber terminal 1 can continuously make a report to a plurality of emergency-call reception switchboards 5 (emergency services). For example, the caller can dial 119 to call an ambulance, and then dial 110 to report to the police. Note that the emergency-call reception switchboards 5 to be reported continuously may be different emergency-call reception switchboards 5 or may be the same emergency-call reception switchboard 5.

Figure 3:
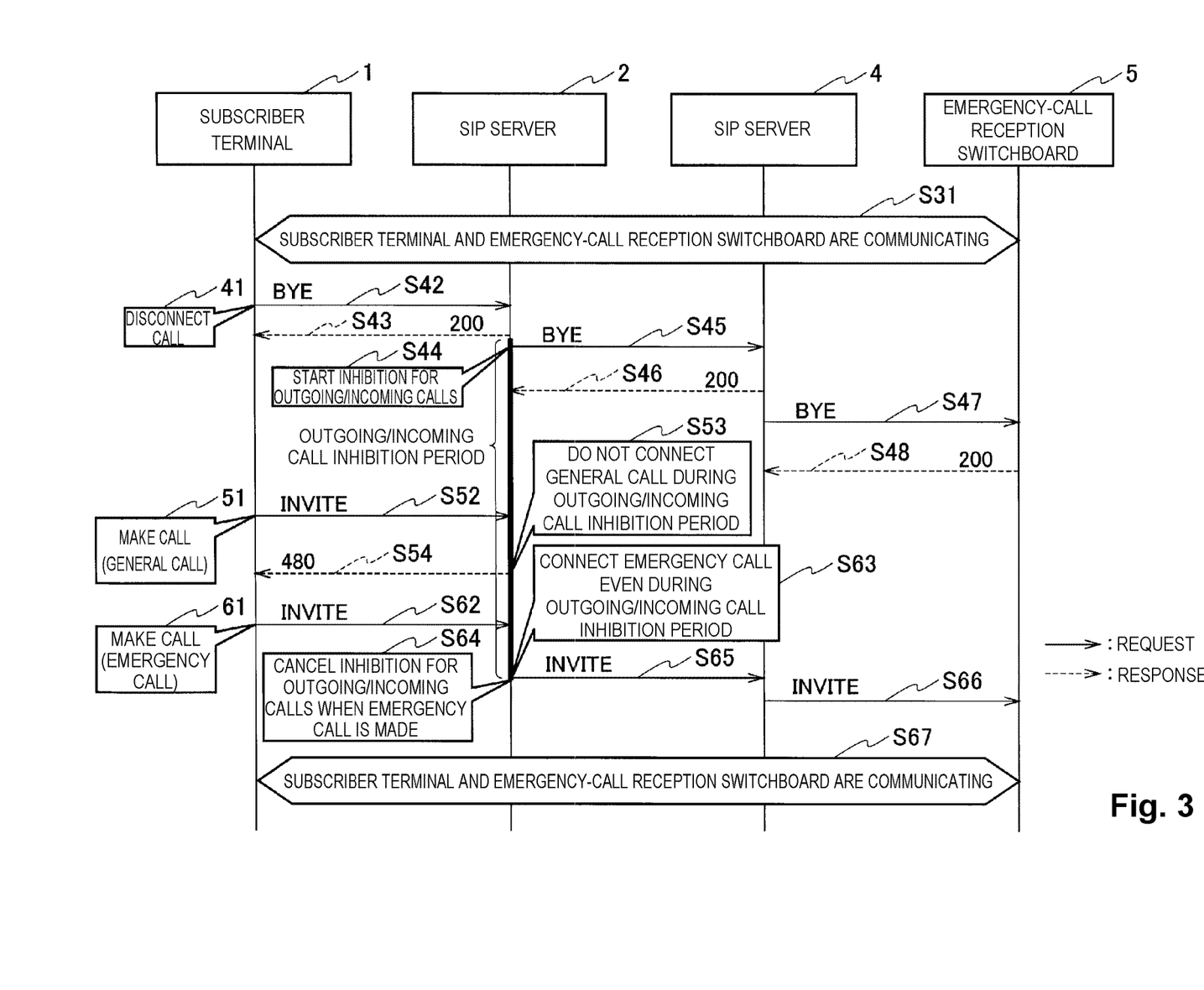
FIG. 3 is a sequence chart showing operations performed during an outgoing/incoming call inhibition period.

FIG. 3 is a sequence chart showing operations of the communication system during the ongoing/incoming call inhibition period.

The emergency call made from the subscriber terminal 1 is connected to the emergency-call reception switchboard 5 via the SIP servers 2, 4, and the caller of the subscriber terminal 1 is communicating with the operator of the emergency-call reception switchboard 5 (S31). In this state, the caller disconnects the emergency call (S41). Thereby, the subscriber terminal 1 transmits a BYE request (session end request) to the SIP server 2 (S42).

The SIP server 2 transmits a response 200 indicating OK to the subscriber terminal 1 (S43), and starts to inhibit outgoing/incoming calls from/to the subscriber terminal 1 (S44). That is, in order to securely make a call-back to the subscriber terminal 1 from the emergency-call reception switchboard 5, the SIP server 2 inhibits outgoing/incoming calls from/to the subscriber terminal 1 during the outgoing/incoming call inhibition period (prescribed period). Then, the SIP server 2 transmits a BYE request to the SIP server 4 that houses the emergency-call reception switchboard 5 (S45).

The SIP server 4 transmits a response 200 to the SIP server 2 (S46), and transmits a BYE request to the emergency-call reception switchboard 5 (S47). The emergency-call reception switchboard 5 transmits a response 200 to the SIP server 4 (S48). Thereby, the emergency call between the subscriber terminal 1 and the emergency-call reception switchboard 5 is disconnected.

When the caller of the subscriber terminal 1 makes a general call to a destination other than the emergency telephone numbers during the emergency call inhibition period (S51), the subscriber terminal 1 transmits an INVITE request (session establishment request) of the general call to the SIP server 2 (S52).

Upon receiving the INVITE request from the subscriber terminal 1 during the emergency call inhibition period, the SIP server 2 determines whether the call of the INVITE request is an emergency call or a general call (S53). Since the INVITE request is a general call, the SIP server 2 does not connect the call, and transmits a response 480 indicating an error to the subscriber terminal 1 (S54).

Further, when the caller of the subscriber terminal 1 makes an emergency call to one of the emergency-call reception switchboards 5 as a destination during the ongoing/incoming call inhibition period (S61), the subscriber terminal 1 transmits an INVITE request of the emergency call to the SIP server 2 having the emergency-call reception switchboard 5 designated by the caller as the destination (S62).

Upon receiving the INVITE request from the subscriber terminal 1 during the ongoing/incoming call inhibition period, the SIP server 2 determines whether the call of the INVITE request is an emergency call or a general call (S63). Since the INVITE request is an emergency call, the SIP server 2 cancels inhibition for outgoing/incoming calls from/ to the subscriber terminal 1 (S64), and transmits an INVITE request to the SIP server 4 in order to connect the call to the emergency-call reception switchboard 5 (S65). The SIP server 4 transmits an INVITE request to the emergency-call reception switchboard 5 as the destination (S66).

Thereby, the call is connected between the subscriber terminal 1 and the emergency-call reception switchboard 5, so that the caller of the subscriber terminal 1 and the operator of the emergency-call reception switchboard 5 come in a communicable state (S67).

Although not illustrated in FIG. 3, as in a case of a general SIP sequence, a response 100 of Trying, a response 180 of Ringing, and a response 200 of OK are transmitted and received after the INVITE request. Specifically, after transmitting the INVITE request in S65, the SIP server 2 transmits a response 100 to the subscriber terminal 1. Further, after receiving the INVITE request in S66, the emergency-call reception switchboard 5 transmits a response 180 to the subscriber terminal 1 via the SIP servers 2, 4, and then transmits a response 200 to the subscriber terminal 1 via the SIP servers 2, 4.

Figure 4:
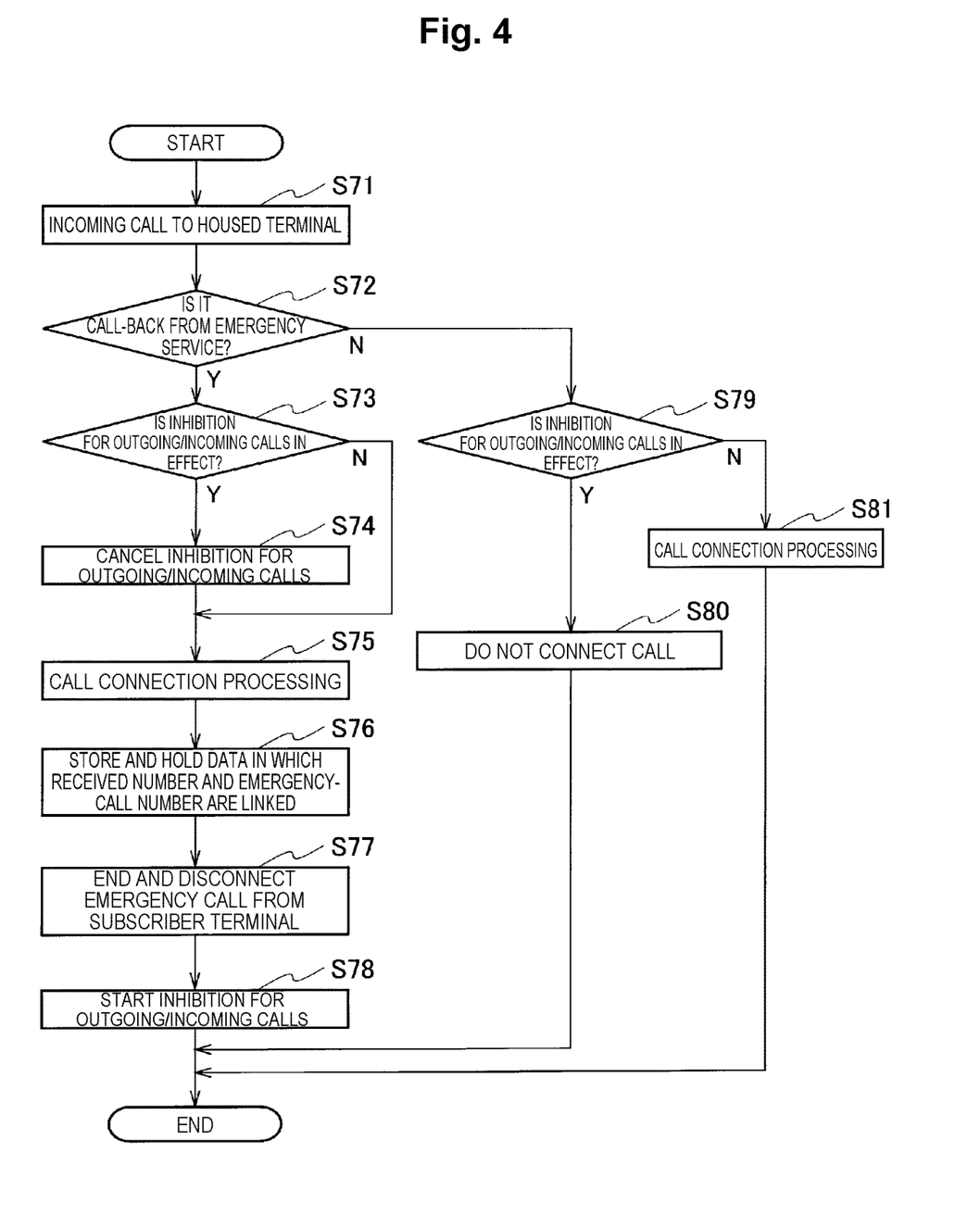
FIG. 4 is a flowchart of incoming call processing.

FIG. 4 is a flowchart of incoming call processing executed by the SIP server 2 that houses the subscriber terminal 1.

The subscriber control unit 22 of the SIP server 2 receives an incoming call to the subscriber terminal 1 (S71), and determines whether or not the received call is a call-back from the emergency-call reception switchboard 5 (S72). When the received call is a call-back, a prescribed identifier indicating that it is a call-back is set in the call. The prescribed identifier is set within Alert-Info header field of the INVITE request of the SIP, for example.

The subscriber control unit 22 determines that it is a call-back from the emergency-call reception switchboard 5 when the prescribed identifier is added to the received call, and determines that it is not a call-back from the emergency-call reception switchboard 5 when the prescribed identifier is not added to the received call.

When it is not a call-back (S72: NO), the subscriber control unit 22 refers to the storage unit 23 and determines whether or not the subscriber terminal 1 as the destination is in the ongoing/incoming call inhibition period (S79). Whether or not it is in the ongoing/incoming call inhibition period is determined in the same manner as that of S19 in FIG. 2.

When the ongoing/incoming call inhibition period is in effect (S79: YES), the subscriber control unit 22 does not execute the processing for connecting (receiving) the call to the subscriber terminal 1 (S80). When the ongoing/incoming call inhibition period is not in effect (S79: NO), the subscriber control unit 22 executes normal call connection processing by using the call control unit 21 (S81). That is, according to an instruction from the subscriber control unit 22, the call control unit 21 executes the processing for connecting the call received in S71 to the subscriber terminal 1.

In the meantime, when it is a call-back (S72: YES), the subscriber control unit 22 refers to the storage unit 23 and determines whether or not the subscriber terminal 1 as the destination is in the ongoing/incoming call inhibition period (S73). When the ongoing/incoming call inhibition period is in effect (S73: YES), the subscriber control unit 22 cancels inhibition for outgoing/incoming calls (S74), and executes call connection processing to the subscriber terminal 1 by using the call control unit 21 (S75). When the ongoing/incoming call inhibition period is not in effect (S73: NO), the subscriber control unit 22 executes call connection processing to the subscriber terminal 1 by using the call control unit 21 (S75). According to an instruction from the subscriber control unit 22, the call control unit 21 executes the processing for connecting (receiving) the call made from the emergency-call reception switchboard 5 in S71 to the subscriber terminal 1. Thereby, the call-back from the emergency-call reception switchboard 5 is received at the subscriber terminal 1, so that the subscriber of the subscriber terminal 1 and the operator of the emergency-call reception switchboard 5 come in a communicable state.

Then, the subscriber control unit 22 stores, in the storage unit 23, the data in which the number of the subscriber terminal 1 connected with the call-back and the number of the emergency-call reception switchboard 5 are linked (S76). Note that the subscriber control unit 22 does not set the flag indicating that the ongoing/incoming call inhibition period is in effect to the data at this point.

Then, upon receiving a call disconnection request from the subscriber terminal 1, the call control unit 21 disconnects the call (session) between the subscriber terminal 1 and the emergency-call reception switchboard 5 (S77). Upon receiving a notification of the call disconnection request from the call control unit 21, the subscriber control unit 22 starts to inhibit outgoing/incoming calls from/to the subscriber terminal 1 that received the call-back from the emergency-call reception switchboard 5 in S71 (S78). That is, when the call-back is disconnected by the subscriber terminal 1, the subscriber control unit 22 inhibits outgoing/incoming calls from/to the subscriber terminal 1 during the ongoing/incoming call inhibition period as the prescribed period. During the outgoing/incoming call inhibition period, the subscriber control unit 22 permits only an incoming call to the subscriber terminal 1 from the emergency-call reception switchboard 5 in order to securely make a call-back from the emergency-call reception switchboard 5.

Further, the subscriber control unit 22 sets a flag indicating that the outgoing/incoming call inhibition period is in effect to the data in which the number of the subscriber terminal 1 and the number of the emergency-call reception switchboard 5 are linked and stored in the storage unit 23 in S74. Thereby, the subscriber control unit 22 can determine the subscriber terminal 1 in the outgoing/incoming call inhibition period by referring to the storage unit 23. Note that the subscriber control unit 22 holds, in the storage unit 23, the data including the number of the called-back subscriber terminal 1 and the number of the emergency-call reception switchboard 5 stored in the storage unit 23 for a prescribed period from the point disconnected by the subscriber terminal 1 in S77.

When a call disconnection request from the emergency-call reception switchboard 5 is received in S77, the call control unit 21 disconnects the call (session) between the subscriber terminal 1 and the emergency-call reception switchboard 5. In that case, the subscriber control unit 22 does not set inhibition for outgoing/incoming calls in S78 and deletes, from the storage unit 23, the data stored in S76 in which the number of the called-back subscriber terminal 1 and the number of the emergency-call reception switchboard 5 are linked.

The SIP server 2 of the embodiment described above includes: the call control unit 21 that connects an emergency call made from the subscriber terminal 1 to the emergency-call reception switchboard 5; and the subscriber control unit 22 that inhibits outgoing/incoming calls from/to the subscriber terminal 1 during the ongoing/incoming call inhibition period as the prescribed period, when the emergency call is disconnected by the subscriber terminal 1. When a call is made from the subscriber terminal 1 in the prescribed period, the subscriber control unit 22 determines whether the call is an emergency call or a general call. When the call is determined as an emergency call, the subscriber control unit 22 cancels inhibition for outgoing/incoming calls from/to the subscriber terminal 1 and connects the call by using the call control unit 21. Further, the subscriber control unit 22 does not connect the call when determined that the call is a general call.

Thereby, with the embodiment, the caller of the subscriber terminal 1 can make an emergency call to report an emergency to the emergency-call reception switchboard 5 even in the ongoing/incoming call inhibition period set for securely making a call-back for the emergency call. That is, with the embodiment, the caller can quickly and continuously make a report to a plurality of emergency-call reception switchboard 5 (emergency services). For example, the caller first can dial 119 to call an ambulance, and then dial 110 to report to the police.

Modification Example

In the embodiment described above, when making an outgoing call from the subscriber terminal 1 and when receiving an incoming call to the subscriber terminal 1, the SIP server 2 collectively cancels inhibition for outgoing/incoming calls (FIG. 2: S14, FIG. 4: S74). However, it is also possible to cancel only inhibition for outgoing calls at the time of making an outgoing call, and to cancel only inhibition for incoming calls at the time of receiving an incoming call.

In that case, in the processing at the time of making an outgoing call, the subscriber control unit 22 of the SIP server 2 determines whether or not "inhibition for outgoing calls is in effect" in S13 of FIG. 2, and "cancels inhibition for outgoing calls" in S14. Further, in the processing at the time of receiving an incoming call, the subscriber control unit 22 determines whether or not "inhibition for incoming calls is in effect" in S73 of FIG. 4, and "cancels inhibition for incoming calls" in S74.

Further, the subscriber control unit 22 manages each of the outgoing-call inhibition state and the incoming-call inhibition state of the subscriber terminal. For example, in the storage unit 23 of the SIP server 2, the data including the number of the subscriber terminal 1 and the number of the emergency-call reception switchboard 5 registered at the time of making an emergency call and a call-back may be stored (FIG. 2: S16, FIG. 4: S76), and an outgoing-call inhibition flag indicating that the outgoing-call inhibition period is in effect and a flag indicating that an incoming-call inhibition period is in effect may be included in the data.

Further, the subscriber control unit 22 may cancel inhibition for outgoing/incoming calls for each of the subscriber terminals or may cancel only the inhibition for outgoing calls or the inhibition for incoming calls. Specifically, when making an emergency call, the subscriber control unit 22 determines whether to cancel the inhibition for outgoing/incoming calls from/to the subscriber terminal 1 or to cancel only the inhibition for outgoing calls made from the subscriber terminal 1 according to a inhibition cancel pattern of the subscriber terminal 1. Further, when receiving a call-back, the outgoing/incoming call inhibition unit 22 determines whether to cancel the inhibition for outgoing/incoming calls from/to the subscriber terminal 1 or to cancel only the inhibition for incoming calls to the subscriber terminal 1 according to the inhibition cancel pattern of the subscriber terminal 1.

At the time of making an outgoing call or receiving an incoming call, the subscriber control unit 22 cancels inhibition of one of following kinds according to the inhibition cancel pattern of the subscriber terminal 1.

[When making outgoing call]: Cancel only inhibition for outgoing calls or cancel inhibition for outgoing/incoming calls

Figure 5:
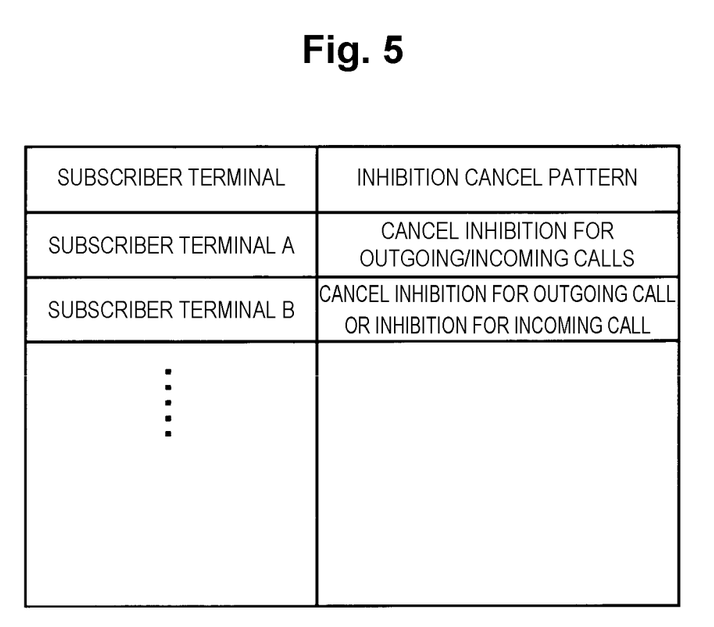
FIG. 5 is a chart showing an example of a cancel pattern table.

[When receiving incoming call]: Cancel only inhibition for incoming calls or cancel inhibition for outgoing/incoming calls In that case, it is assumed that the storage unit 23 of the SIP server 2 holds a table showing inhibition cancel patterns for each of the subscriber terminals 1 (subscribers) as illustrated in FIG. 5, for example. The illustrated table shows that the inhibition for outgoing/incoming calls is cancelled at the time of making an outgoing call and at the time of receiving an incoming call for a subscriber terminal A, while only the inhibition for outgoing calls is cancelled at the time of making an outgoing call and only the inhibition for incoming calls is cancelled at the time of receiving an incoming call for a subscriber terminal B.

Note that the present invention is not limited to the embodiment and the modification example described above, but various changes are possible within the scope of the gist thereof.

REFERENCE SIGNS LIST

1 Subscriber terminal
2 SIP server
21 Call control unit
22 Subscriber control unit
23 Storage unit
3 IP telephone network
4 SIP server
41 Call control unit
42 Subscriber control unit
43 Storage unit
5 Emergency-call reception switchboard

The invention claimed is:

1. A communication control device housing a subscriber terminal, the communication control device comprising one or more processors configured to perform operations comprising:

connecting an emergency call made from the subscriber terminal to an emergency-call reception switchboard;

inhibiting outgoing calls from the subscriber terminal or incoming calls to the subscriber terminal in a prescribed period, when the emergency call is disconnected by the subscriber terminal; and when a call is made from the subscriber terminal in the prescribed period, determining whether the call is an emergency call or a general call based on a destination telephone number; in a case of an emergency call, canceling inhibition for outgoing calls from the subscriber terminal or incoming calls to the subscriber terminal and connecting the call; and in a case of a general call, not connecting the call.

2. The communication control device according to claim 1, wherein the operations comprise: storing, in a storage medium, data including a caller number and a destination number of an emergency call made from the subscriber terminal; and hold the data in the storage medium during the prescribed period from a point where the emergency call is disconnected by the subscriber terminal.

3. The communication control device according to claim 1, wherein the operations comprise: in a case of the emergency call, determining whether to cancel the inhibition for both the outgoing calls from the subscriber terminal and incoming calls to the subscriber terminal or to cancel only inhibition for outgoing calls from the subscriber terminal according to an inhibition cancel pattern of the subscriber terminal.

4. An emergency call method performed by a communication control device housing a subscriber terminal, the emergency call method comprising:
   connecting an emergency call made from the subscriber terminal to an emergency-call reception switchboard;
   inhibiting outgoing calls from the subscriber terminal or incoming calls to the subscriber terminal in a prescribed period, when the emergency call is disconnected by the subscriber terminal; and
   when a call is made from the subscriber terminal in the prescribed period, determining whether the call is an emergency call or a general call based on a destination telephone number; in a case of an emergency call, canceling inhibition for outgoing calls from the subscriber terminal or incoming calls to the subscriber terminal and connecting the call; and in a case of a general call, not connecting the call.

5. The emergency call method according to claim 4, further comprising:
   storing, in a storage medium, data including a caller number and a destination number of an emergency call made from the subscriber terminal; and
   holding the data in the storage medium during the prescribed period from a point where the emergency call is disconnected by the subscriber terminal.

6. The emergency call method according to claim 4, further comprising:
   in a case of the emergency call, determining whether to cancel the inhibition for both the outgoing calls from the subscriber terminal and incoming calls to the subscriber terminal or to cancel only inhibition for outgoing calls from the subscriber terminal according to an inhibition cancel pattern of the subscriber terminal.

7. A non-transitory computer readable medium storing one or more instructions causing a computer, that functions as a communication control device housing a subscriber terminal, to execute:
   connecting an emergency call made from the subscriber terminal to an emergency-call reception switchboard;
   inhibiting outgoing calls from the subscriber terminal or incoming calls to the subscriber terminal in a prescribed period, when the emergency call is disconnected by the subscriber terminal; and
   when a call is made from the subscriber terminal in the prescribed period, determining whether the call is an emergency call or a general call based on a destination telephone number; in a case of an emergency call, canceling inhibition for outgoing calls from the subscriber terminal or incoming calls to the subscriber terminal and connecting the call; and in a case of a general call, not connecting the call.

8. The non-transitory computer readable medium according to claim 7, wherein the one or more instructions further cause the computer to execute:
   storing, in a storage medium, data including a caller number and a destination number of an emergency call made from the subscriber terminal; and
   holding the data in the storage medium during the prescribed period from a point where the emergency call is disconnected by the subscriber terminal.

9. The non-transitory computer readable medium according to claim 7, wherein the one or more instructions further cause the computer to execute:
   in a case of the emergency call, determining whether to cancel the inhibition for both the outgoing calls from the subscriber terminal and incoming calls to the subscriber terminal or to cancel only inhibition for outgoing calls from the subscriber terminal according to an inhibition cancel pattern of the subscriber terminal.

* * * * *